(12) United States Patent
Widin

(10) Patent No.: US 6,481,938 B2
(45) Date of Patent: Nov. 19, 2002

(54) DRILLING TOOL INCLUDING A SHANK AND A CUTTING BODY DETACHABLY SECURED THERETO

(75) Inventor: Leif Widin, Sandviken (SE)

(73) Assignee: Sandvik AB, Sandviken (SE)

( * ) Notice: Subject to any disclaimer, the term of this patent is extended or adjusted under 35 U.S.C. 154(b) by 23 days.

(21) Appl. No.: 09/810,493

(22) Filed: Mar. 19, 2001

(65) Prior Publication Data

US 2001/0031182 A1 Oct. 18, 2001

(30) Foreign Application Priority Data

Mar. 17, 2000 (SE) .............................................. 0000883

(51) Int. Cl.⁷ .............................................. B23B 51/02
(52) U.S. Cl. ........................ 408/226; 408/230; 408/233; 408/713
(58) Field of Search ............................ 408/57, 59, 144, 408/223, 224, 227, 229, 230, 226, 231, 233, 713, 228

(56) References Cited

U.S. PATENT DOCUMENTS

| | | | |
|---|---|---|---|
| 2,237,901 A | * | 4/1941 | Chun .......................... 408/233 |
| 3,333,489 A | * | 8/1967 | Mossberg ................... 408/233 |
| 4,355,932 A | * | 10/1982 | Koppelmann et al. ...... 408/713 |
| 4,728,231 A | | 3/1988 | Kunimori et al. |
| 4,744,704 A | | 5/1988 | Galvefors |
| 4,854,789 A | * | 8/1989 | Evseanko, Jr. .............. 408/233 |
| 4,961,672 A | | 10/1990 | Lindberg |
| 5,228,812 A | * | 7/1993 | Noguchi et al. ............ 408/713 |
| 5,599,145 A | * | 2/1997 | Reinauer et al. ............ 408/233 |
| 5,607,263 A | | 3/1997 | Nespeta et al. |
| 5,649,794 A | * | 7/1997 | Kress et al. ................. 408/233 |
| 6,059,492 A | * | 5/2000 | Hecht .......................... 408/713 |

FOREIGN PATENT DOCUMENTS

| | | | |
|---|---|---|---|
| DE | 34 48 086 | | 12/1991 |
| EP | 118806 B1 | * | 11/1987 ................. 408/713 |

* cited by examiner

Primary Examiner—Daniel W. Howell
(74) Attorney, Agent, or Firm—Burns, Doane, Swecker & Mathis, LLP

(57) ABSTRACT

A drilling tool includes a shaft having a front end to which a cutting body provided with cutting edges is detachably connected. In the front end of the shaft, a seat is formed which is delimited by spaced-apart protrusions between which there is a bottom surface. In the protrusion, there is a threaded hole for a screw, which when tightened applies pre-stressing forces to the cutting body. On the inside of the opposite protrusion, there is a supporting shoulder against which the cutting body is pressed when the screw is tightened and applies a lateral pre-stressing force to the cutting body. The protrusions are laterally displaced in relation to each other in order to freely expose the screw beside one of the protrusions.

20 Claims, 5 Drawing Sheets

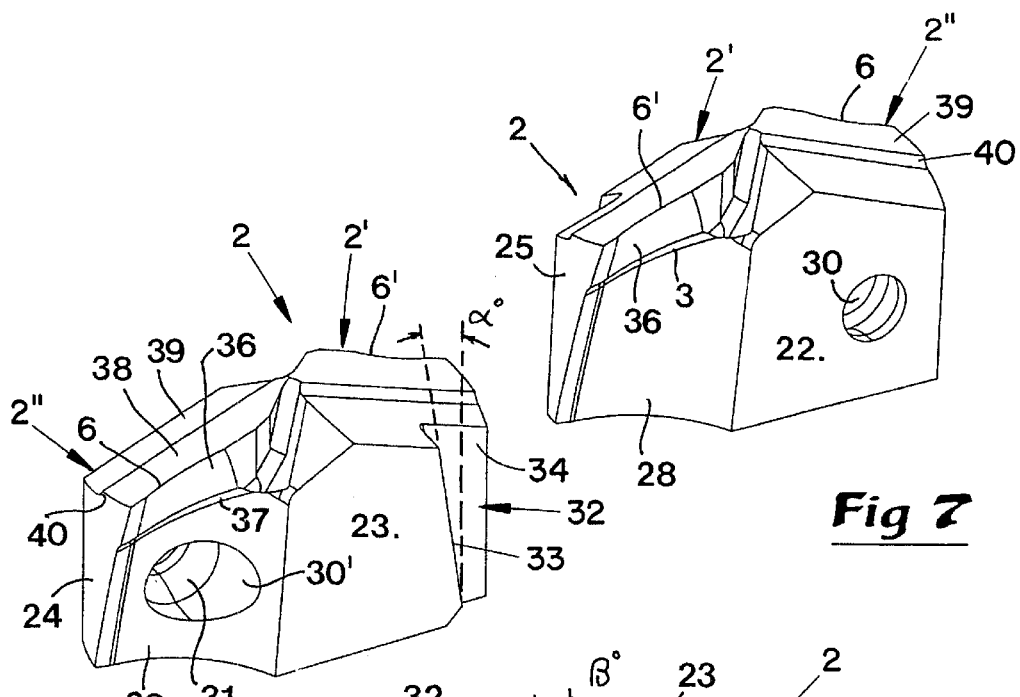
Fig 7
Fig 6
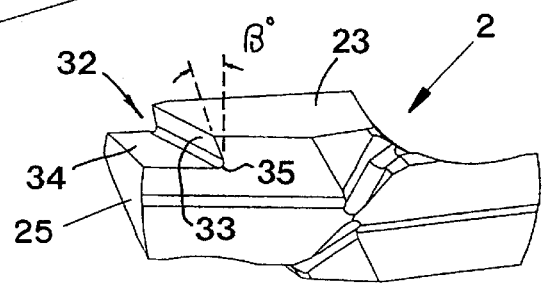
Fig 8
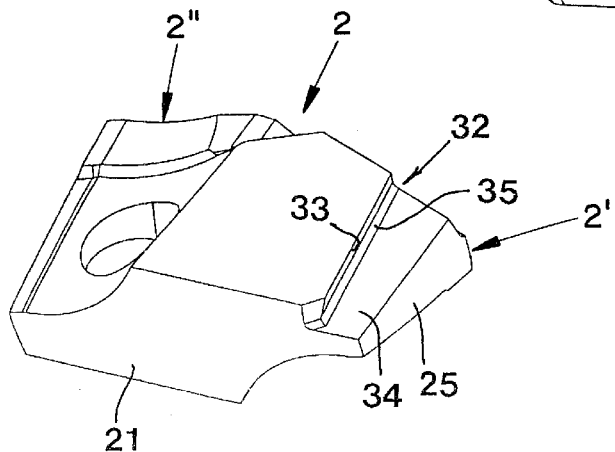
Fig 9

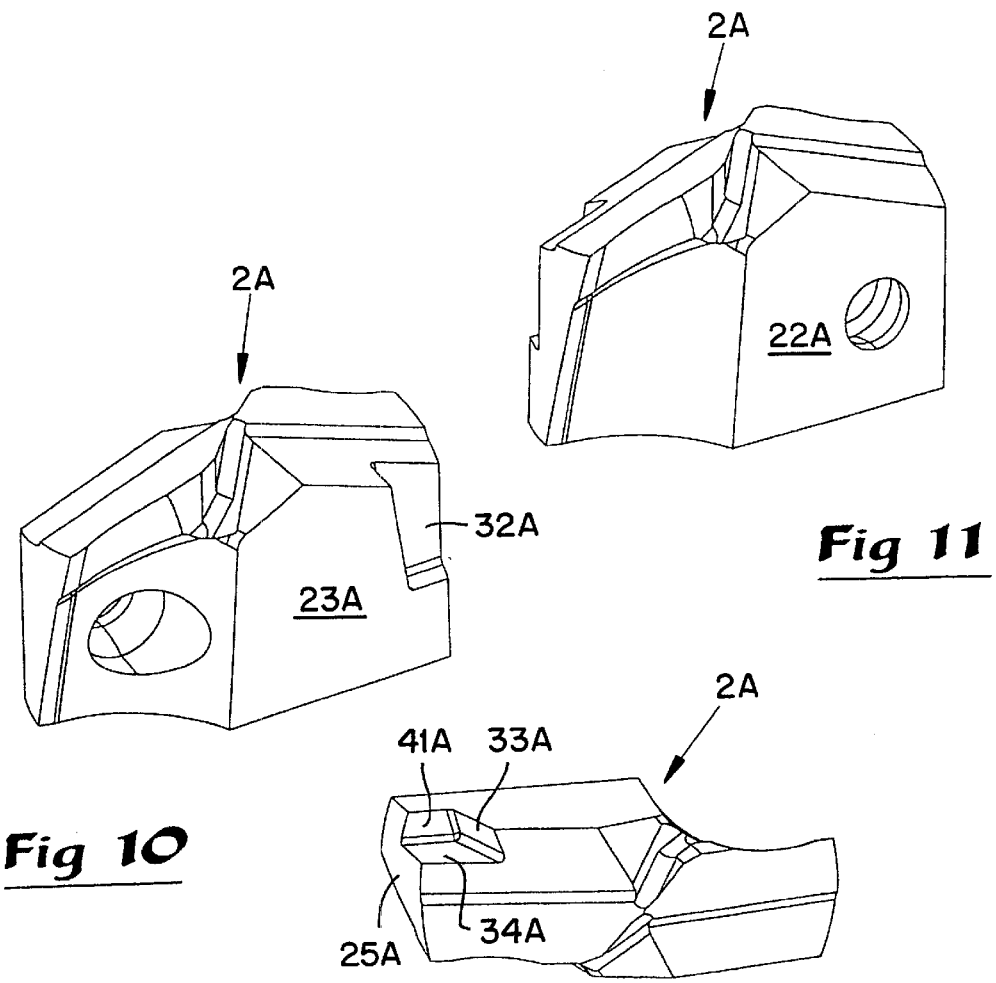
Fig 10
Fig 11
Fig 12
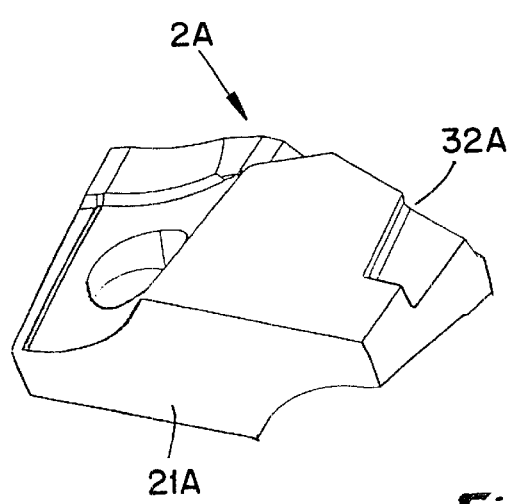
Fig 13

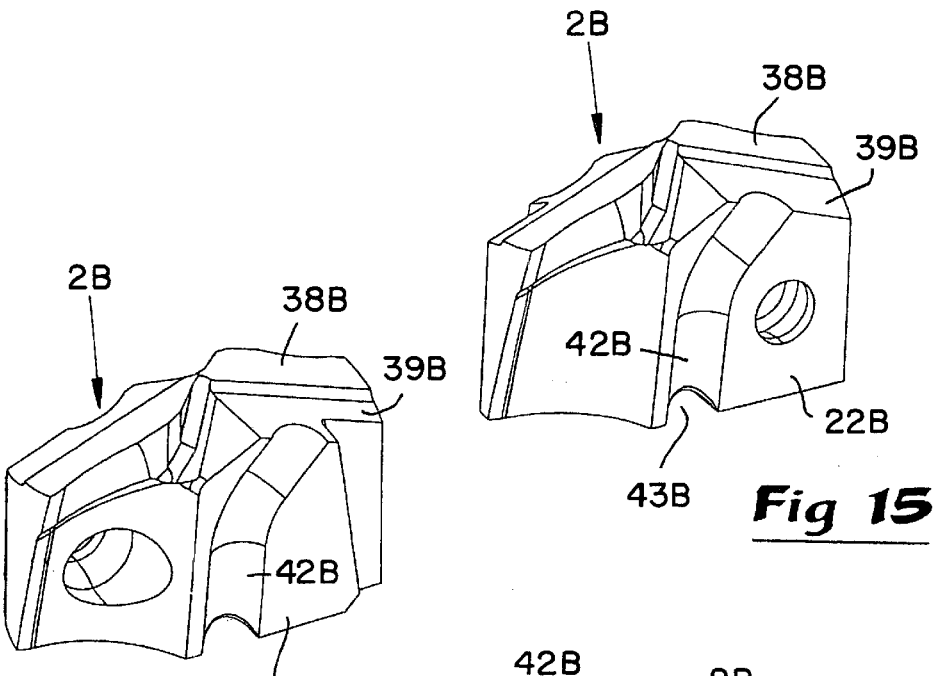
Fig 14
Fig 15
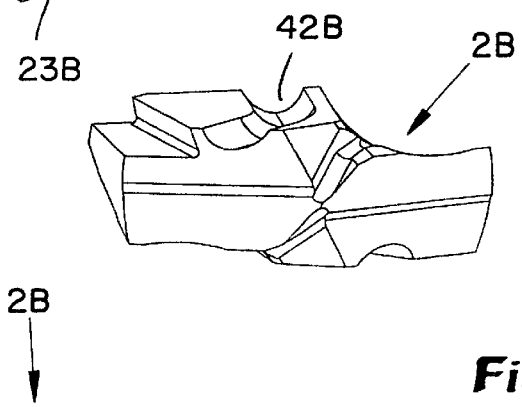
Fig 16
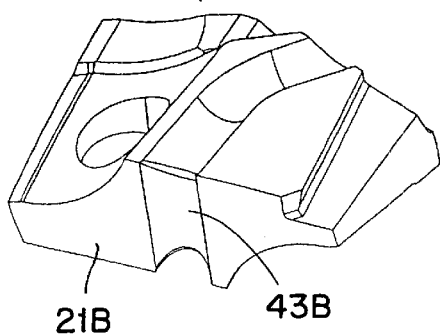
Fig 17

DRILLING TOOL INCLUDING A SHANK AND A CUTTING BODY DETACHABLY SECURED THERETO

RELATED INVENTION

This application claims priority under 35 U.S.C. §§119 and/or 365 to patent application Ser. No. 0000883-9 filed in Sweden on Mar. 17, 2000; the entire content of which is hereby incorporated by reference.

1. Technical Field of the Invention

This invention relates to a drilling tool of the type that comprises a shaft having a front end to which a cutting body provided with cutting edges is detachably connected by means of a screw.

2. Prior Art

Recently, it has become common to manufacture not only drilling tools but also other types of chip forming tools, such as shaft-type cutters, thread cutters and the like, from two separate components, namely on the one hand, a shaft, which most often has a long narrow, cylindrical shape, and on the other hand a cutting body provided with cutting edges which can be detachably connected to a front end of the shaft. In modern machine tools, the tool shafts are so sophisticated and expensive that they, for economic reasons, are no longer integrated with the wearing part of the tool, namely the cutting body, to form a single tool which has to be discarded when the cutting body has worn out. In other words, it is profitable to make the actual cutting body as a detachable unit, which can be replaced, while the expensive shaft may be used for a long time.

Generally, the cutting bodies of the tools are assembled on the shafts by means of screw. In certain tools, such as milling tools (see e.g, U.S. Pat. No. 5,607,263 and DE 34 48 086), simple screws are used which are screwed fast into a threaded hole in the front end of the shaft via a through hole in the cutting body. A serious disadvantage with this design, however, is that chip-forming edges cannot be formed in the center area of the front or top surface of the cutting body, and therefore the cutting body cannot be designed for drilling purposes. For this reason, previously known drilling tools having replaceable cutting bodies are structurally complicated and demand a plurality of details, such as screws, springs or drawbars for the fastening of the cutting body. This means, in practice, that the assembly as well as the disassembly of the cutting body become complicated and time-consuming at the same time as difficulties arise in centering the cutting body in relation to the shaft in an exact manner. Furthermore, the fixation becomes unreliable inasmuch as the cutting body may be dislodged from an initially centered position during operation.

AIMS AND FEATURES OF THE INVENTION

The present invention aims at obviating the above-mentioned shortcomings of previously known drilling tools having replaceable cutting bodies and at providing an improved drilling tool. Therefore, a primary aim of the invention is to provide a drilling tool which with simple and few means can safeguard the cutting body of the tool on the shaft in a centered state which in a reliable manner is retained during the cutting operation. An additional aim is to create a drilling tool, the cutting body of which can be assembled and disassembled, respectively, in a simple and fast manner. Another aim is to create a drilling tool, the cutting body of which is self-centering inasmuch as the cutting body in connection with the drilling operation is brought automatically to assume the correct position also in such cases as when the cutting body is assembled initially in an incorrect manner. In one particular aspect, the invention also aims at providing a drilling tool having an improved cooling ability.

According to the invention, at least the primary aim is attained by a drilling tool comprising a rotary shaft and a cutting body detachably connected by a fastening screw in a seat formed in a front surface of the shaft. The seat includes first and second spaced-apart protrusions projecting forwardly from a bottom surface of the seat and disposed on opposite sides of a center axis of the shaft. The protrusions include respective first and second inner surfaces facing one another. The first protrusion includes a screw-threaded first hole extending into the first inner surface. The second protrusion includes a supporting shoulder projecting from an end of the second inner surface located remotely from the first protrusion. The supporting shoulder includes a first supporting surface facing generally in the same direction as the second inner surface, and a first abutment surface facing in a direction laterally of the direction in which the second inner surface faces. The abutment surface faces generally in a direction toward an end of the second protrusion located proximate the first protrusion. A distance between the second inner surface and the first supporting surface defines a thickness of the supporting shoulder. The cutting body forms a cutting edge structure and includes first and second flank parts disposed adjacent the first and second protrusions, respectively. The cutting body includes first and second outer side surfaces facing the first and second inner surfaces, respectively. The second flank part includes a recess in which the supporting shoulder is received. The recess includes a second abutment surface, and a second supporting surface respectively facing the first abutment surface and the first supporting surface. A depth of the recess is less than the thickness of the supporting shoulder, wherein the first and second supporting surfaces abut one another, and the second side surface is spaced from the second inner surface. The first flank part includes a non-threaded second hole extending therethrough and passing through the first and second side surfaces. The fastening screw extends through the second hole and is threadedly secured in the first hole. The first and second holes are slightly non-aligned wherein a tightening of the fastening screw applies a first force pressing the first inner surface and the first side surface against one another, and a second force pressing the first and second abutment surfaces against one another.

The present invention also pertains to a cutting body per se which is adapted for use in a metal-cutting drill. The cutting body comprises a top surface and a bottom surface facing in opposite directions. The top surface forms cutting edges. First and second flank surfaces extend downwardly from opposite ends of the top surface. First and second side surfaces extend downwardly from opposite sides of the top surface. Each side surface extends from the first flank surface to the second flank surface. A recess is formed in the body and is arranged to intersect both the second flank surface and the second side surface. A non-threaded through-hole extends through the cutter body from the first side surface to the second side surface and is situated closer to the first flank surface than to the second flank surface.

BRIEF DESCRIPTION OF THE DRAWINGS

The objects and advantages of the invention will become apparent from the following detailed description of preferred embodiments thereof, in connection with the accompanying drawings, in which like numerals designate like elements, and in which:

FIG. 6 is a perspective view of a cutting body according to the invention seen from a first side, FIG. 7 is a perspective view showing the same cutting body from the opposite side, FIG. 8 is a perspective view of the same cutting body seen obliquely from the front, FIG. 9 is a perspective view showing the cutting body obliquely from behind, FIG. 10 is a perspective view of a cutting body according to a second embodiment of the invention, as seen from a first side, FIG. 11 is a perspective view showing the cutting body of FIG. 10 from the opposite side, FIG. 12 is a perspective view of the cutting body of FIG. 10, as seen obliquely from the front, FIG. 13 is a perspective view showing the cutting body of FIG. 10 obliquely from behind, FIG. 14 is a perspective view of a cutting body according to a third embodiment of the invention as seen from a first side, FIG. 15 is a perspective view showing the cutting body of FIG. 14 from the opposite side FIG. 16 is a perspective view of the cutting body of FIG. 14 as seen obliquely from the front, FIG. 17 is a perspective view of the cutting body of FIG. 14 as seen obliquely from behind.

DETAILED DESCRIPTION OF PREFERRED EMBODIMENTS OF THE INVENTION

Figure 1:
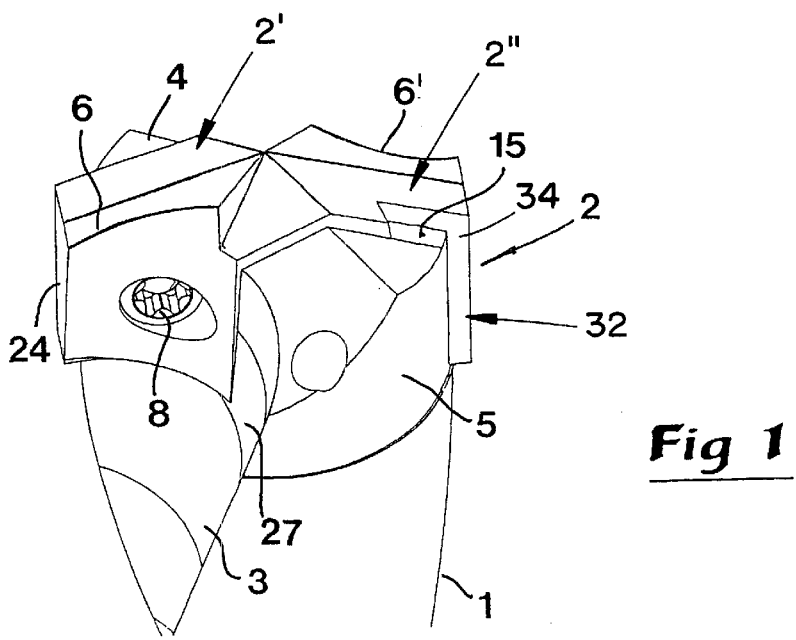
FIG. 1 is a partial perspective view of a drilling tool according to the invention, whereby a cutting body is shown located in a seat in a free end of a shaft.
Figure 2:
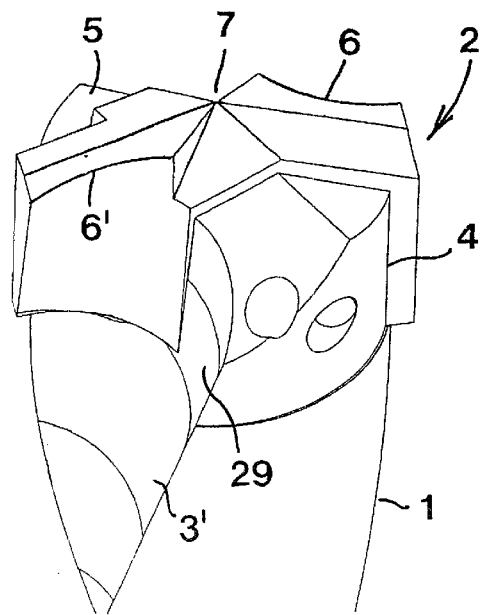
FIG. 2 is a perspective view showing the same tool as in FIG. 1 from the opposite side.

A front end of a drilling tool which includes a shaft 1 and a cutting body 2 is shown from opposite directions in FIGS. 1 and 2, respectively. In a conventional manner, the shaft 1 has an elongated cylindrical basic shape and two opposing chip channels 3, 3' extending helicoidally along the shaft in the rearward direction from the cutting body. The cutting body 2 is assembled on a seat formed in a front end of the shaft 1 which seat will be described in more detail with reference being made to FIGS. 3–5. Said seat, which by those skilled in the art is denominated a cutting seat, is delimited by two spaced-apart, axially projecting protrusions 4, 5 disposed on opposite sides of a center axis of the shaft. The front or axially outer portion (or top surface) of the cutting body 2 has one or more chip forming edges. In the example, the drill tool is assumed to be of a so-called DELTA-Hype, whereby two cutting edges 6, 6', illustrated schematically in FIGS. 1 and 2, extend at an obtuse angle to a common tip 7 at the center of the cutting body. In FIG. 1, numeral 8 designates a screw, the purpose of which will be described closer below.

Figure 3:
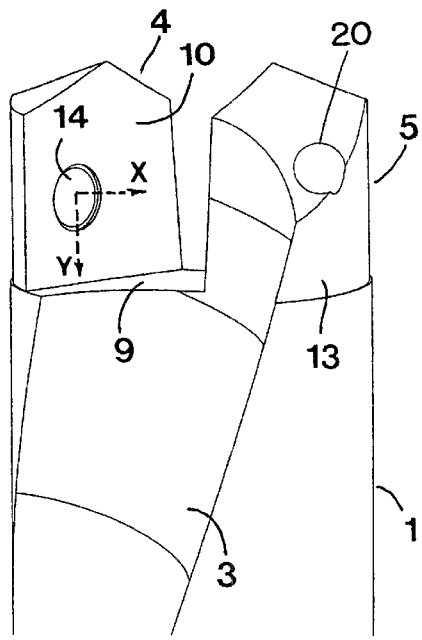
FIG. 3 is a perspective view showing only the actual shaft of the tool from the same side as in FIG. 1.
Figure 4:
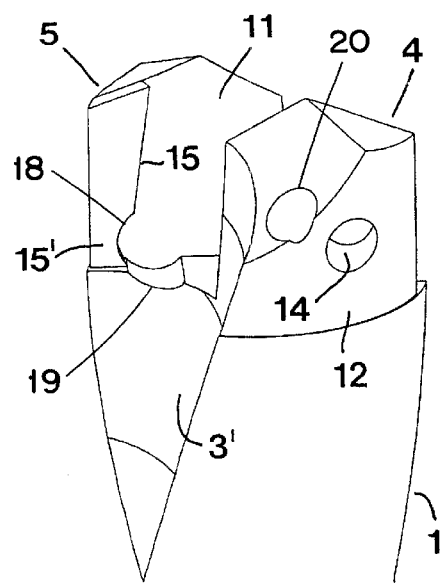
FIG. 4 is a perspective view showing the shaft from the same side as in FIG. 2.
Figure 5:
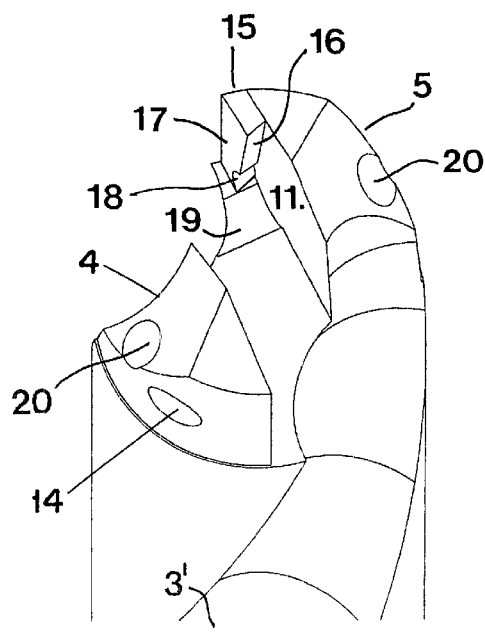
FIG. 5 is a perspective view of the same shaft as seen in FIGS. 3 and 4 but at a steeper angle.

Reference is now made to FIGS. 3–5, which more clearly illustrate the seat in which the cutting body 2 is housed. In these figures, it is seen how the two axially projecting protrusions 4, 5 are spaced apart by a planar bottom surface 9, which extends perpendicularly to the geometrical length or center axis of the drill shaft 1. The protrusions 4, 5 include planar inner surfaces 10 and 11, respectively, which to advantage are mutually parallel and extend parallel to the center axis of the shaft, i.e. perpendicular to the bottom surface 9. The inner surfaces 10, 11 face another. The outer surfaces 12, 13 of the protrusions are, on the contrary, convexly arched in order to, in the main, correspond to the cylindrical basic shape of the shaft 1. A threaded hole 14 is formed in the first protrusion 4, which to advantage—though not necessarily—may be a through hole, i.e. extending from the inner surface 10 to the outer surface 12. The screw 8 can be fastened in this threaded hole 14.

A supporting shoulder 15 is formed on the inner surface 11 of the second protrusion 5 which shoulder has a first abutment surface 16, as well as a first support surface 17 which is parallel to the inner surface 10 of the protrusion 4 (advantageously—though not necessarily—it may also be parallel to the inner surface 11 of the protrusion 5). It will be appreciated that: (i) the supporting shoulder is disposed at an end of the second protrusion 5 located remotely of the first protrusion 4, (ii) the first support surface faces in the same direction as the inner surface 11, and (iii) the first abutment surface 15 faces in a direction which is lateral with respect to the direction in which the inner surface 11 faces, and which lateral direction is toward an end of the second protrusion disposed proximate the first protrusion 4. In the embodiment which is shown in FIGS. 4 and 5, the shoulder 15 is, in the area of the axially inner or rear end thereof, formed with a narrowed waist 15', which is delimited by a concavely arched surface 18. The waist 15', together with a concavely arched countersunk surface 19 in the plane bottom surface 9, define a curved corner space between the shoulder 15 and the bottom surface 9.

Ducts 20 for cooling liquid may port in (i.e., intersect) the two protrusions 4, 5. The ducts communicate with an axial channel (not shown) in the shank.

Reference is now made to FIGS. 6–9, which in detail illustrate the design of the cutting body 2. The cutting body includes right and left flank parts 2', 2", each having a cutting edge as will be explained. The flank parts share a common planar bottom surface 21 disposed axially opposite the cutting edges 6, 6'. The first and second flank parts 2', 2" are situated adjacent the first and second protrusions, 4, 5 respectfully. Two planar external side surfaces 22, 23 extend perpendicularly to said surface 21, of which the one surface 22 is intended to face the inner surface 10 of the protrusion 4, while the surface 23 is intended to face the inner surface 11 of the protrusion 5. In the exemplified embodiment, the cutting body 2 has, at the opposite short ends thereof, arched flank surfaces 24, 25, which extend from the bottom side 21 to the area of the respective cutting edges 6, 6'. In a conventional manner, said flank surfaces have a certain clearance, i.e. extend at a limited angle obliquely inwards rearwards from the outer ends of the cutting edges (instead, the requisite clearance could be provided in other ways). A concavely arched surface 26 extends between the planar surface 23 and the flank surface 24, having the same basic shape as the chip channel 3. Therefore, when the cutting body is assembled in the appurtenant seat, the surface 26 together with a concavely arched surface 27 of the protrusion 5 (see FIG. 1) define an extension of the arched surface in the drill shaft defining the chip channel 3. Correspondingly, a concavely arched surface 28 extends between the planar surface 22 of the cutting body and the flank surface 25 in order to form, together with a concavely arched surface 29 (see FIG. 2) of the protrusion 4, an extension of the chip channel 3' up to the appurtenant cutting edge.

A through hole 30 which is not threaded extends through the flank part of the cutting body 2 as illustrated to the left in FIG. 6, and intersects the surfaces 26 and 22. The part of the hole 30 that ports into the surface 22 has only a slightly larger diameter than the shaft of the screw 8. At the opposite end thereof, however, the hole widens into a space 30' in which a head of the screw may be housed. In doing so, the head of the screw may be pressed against a ring-shaped surface 31, which forms the bottom of the space 30'. In a manner characteristic of the invention, the holes 14 and 30 are slightly non-aligned with one another in order to, in manner known per se, apply a certain pre-stressing force to the cutting body 2 in connection with the tightening of the screw. Such a non-alignment of the holes 14, 30 may be effected in various ways. One way is to tilt either of the two holes in relation to the other one. The threaded hole 14 may, for instance, extend at a certain (extraordinarily moderate) angle in relation to the surface 10, while the non-threaded hole 30 extends perpendicularly to the surface 22. Another way is to form the holes mutually parallel, although somewhat laterally displaced in relation to each other. In combination with the eccentricity between the holes, the threads of the screw 8 and the hole 14, respectively, may be made with a certain play, and the material in the screw having a certain elasticity. Thanks to the eccentricity between the holes, in combination with a certain thread play and a certain elasticity in the screw, the screw may be brought to affect the cutting body with two pre-stressing forces acting in different directions, namely on one hand, a force acting laterally and which is schematically outlined at X in FIG. 3, and on the other hand an axial force Y which aims to pre-stress the cutting body axially in the inward or rearward direction. Therefore, in connection with the tightening of the screw 8, the cutting body will not only have the surface 22 pressed against the inner surface 10 of the protrusion 4, but also the bottom side 21 will be pressed against the bottom surface 9 of the seat, and the cutting body will also be subjected to a lateral force in the X direction. In this connection, it should be pointed out that the pressing of the bottom side 21 against the bottom surface 9 is particularly marked in that flank part of the cutting body which is situated closest to the hole 30 and the screw 8.

In the area between the surface 23 and the flank surface 25, the cutting body has a recess 32 which is delimited by a second abutment surface 33, as well as a second support surface 34. Said surfaces 33, 34 are intended to co-operate with the aforementioned surfaces 16 and 17, respectively, of the supporting shoulder 15. Between the surfaces 33 and 34, there is a cavity 35 which guarantees that the edge portion between the surfaces 16 and 17 of the supporting shoulder 15 cannot touch the bottom in the recess 32. (In order to avoid contact between said edge pordon and the corner between the surfaces 33 and 34, the edge portion may also be rounded with a suitable radius.) It should be pointed out that the supporting shoulder 15 has a thickness (i.e., a distance between surfaces 11 and 17) which is at least somewhat larger than the depth of the recess 32 (i.e., a distance between surfaces 23 and 34), which means that the outer surface 23 of the cutting body cannot come in contact with the inner surface 11 of the protrusion 5 when the cutting body is assembled in the seat and the support surface 34 is pressed against the support surface 17 of the supporting shoulder 15.

In the preferred embodiment which is shown in FIGS. 6–9, the abutment surface 33 is oblique at a certain angle α in the direction axially forwards radially inwards from the rear-end thereof. It is to advantage if said angle a is within the range of 5–12° and attains, for instance, 8°. Also other angular values are, however, feasible. Thus, the angle may vary all the way from 1° to approximately 15°. By this inclination of the abutment surface 33, the cutting body will, when fixed by means of the screw 8, be subjected to a wedge action which presses the cutting body in the axially rearward direction. In other words, in particular the part of the bottom side 21 of the cutting body, which is distanced from the screw, will be pressed against the bottom surface 9 of the seat. Thus, the wedge action which is achieved by co-operation between the abutment surfaces 16 and 33 cooperates with the pre-stressing force in the Y direction which is achieved already by the screw 8, whereby the two opposite flank parts of the cutting body are pressed at the same time with a marked force against the bottom surface 9 of the seat.

As furthermore is seen in FIG. 8, the abutment surface 33 is inclined from the radially inner end of the support surface 34 in a direction having a radially outward direction to form an acute angle relative to the surface 34. Generally, this angle may vary within the range of 60–89° implying that the complementary angle β may vary within the range of 30–1°. Advantageously, the angle β is within the range of 5–20°. The angle β may, for instance, be about 15°. Through the inclination of the abutment surface 33 in relation to the support surface 34, an additional wedge action is achieved which, when the cutting body is subjected to a pre-stressing force in the X direction, ensures that the support surface 34 is pressed distinctly against the corresponding support surface 17 of the shoulder 15. As has previously been pointed out, the thickness of the shoulder 15 is somewhat larger than the depth of the recess 32, and therefore the surface 23 will be spaced from the inner surface 11 of the protrusion 5. In this manner, it is guaranteed that the cutting body 2 does not become over-determined in connection with the fixation in the appurtenant seat.

It should be pointed out particularly that the two protrusions 4, 5 are laterally displaced in relation to each other (i.e. not located opposite each other), so that the hole 14 is exposed to enable the screw 8 to be inserted in a direction passing alongside the protrusion 5 (compare FIGS. 1 and 3).

The width of the recess 32 (i.e., the distance from the surface 25 to the surface 33) as well as the corresponding width of the co-operating supporting shoulder 15 may vary considerably. Thus, this width dimension may be increased considerably in comparison with the embodiment example according to FIGS. 6–9, e.g. so far that the abutment surface 33 is located near the center of the cutting body, whereby the size of the surface 23 would be reduced to the same extent. It should also be mentioned that the depth of the recess 32 may vary considerably.

It should furthermore be pointed out that the chip breaking surface 36 in connection with each cutting edge 6, 6' is comparatively narrow in a direction parallel to the center axis as a result of being spaced from the arched surface 26 and 28, respectively, by a transition surface 37. In other words, the arched surface 26, 28 is somewhat countersunk in relation to the chip surface 36. In an analogous manner, each flank surface 38 behind the appurtenant cutting edge 6, 6' is comparatively narrow due to its being spaced-apart from a countersunk surface 39 via a transition portion 40. Thanks to the surfaces 36, 38 being comparatively narrow, the need for precision grinding in connection with the manufacture of the cutting body is minimized.

In manufacturing the shaft 1 as well as the cutting body 2, different materials may be used. The actual shaft is suitably made of steel while the cutting body is made of a harder and more wear-resistant material. In practice, respective parts of the cutting body may be composed of different materials, whereby the actual chip forming portion in connection with the cutting edges may comprise of steel, high speed steel, cemented carbide, cubic boron nitride, polycrystalline diamond or the like. That edge portion could also be composed of combinations of different materials, e.g. cemented carbide in combination with polycrystalline diamond. The remaining part of the cutting body could be manufactured from, for instance, aluminium, steel, high-speed steel, heavy alloy, cemented carbide or the like.

In practice, the drill tool may have an active diameter within the range of 10–40 mm, although also larger alternatives are feasible.

The Function and Advantages of the Invention

The assembly of the cutting body 2 to the front seat of the shaft 1 is simple. Thus, the cutting body is assembled in the seat with the abutment and support surfaces 33, 34 of the recess 32 in facing relationship to the corresponding abutment and support surfaces 16, 17, respectively, of the supporting shoulder 15, and then the single screw 8 is fastened in the hole 14. As has been pointed out above, the cutting body will, in this connection, be subject to pre-stressing forces which press the bottom side 21 of the flank part 2" of the body distinctly against the bottom surface 9 of the seat as well as pressing distinctly the abutment surface 33 against the abutment surface 16 and pressing distinctly the support surface 34 against the support surface 17, whereby the wedge action of the supporting shoulder 15 also presses the flank part 2' of the body against the bottom surface 9. By the axial tensile action of the screw, the outer surface 22 is simultaneously pressed against the inner surface 10 of the protrusion 4, while the opposite outer surface 23 is free of (i.e., does not contact) the inner surface 11 of the protrusion 5. In other words, the cutting body is fixed in the seat without being over-determined. If the cutting body should be placed initially in a non-centered orientation in the seat, the cutting body will become centered as a consequence of the described interaction of forces between the cutting body and the supporting shoulder 15.

A substantial advantage of the invention is that the cutting body may be fixed in the desired, centered state by means of a single, simple screw, which can be tightened and loosened, respectively, by means of a simple, conventional key or screwdriver. In other words, each repetitive change of cutting body may be carried out in a simple and fast manner while maintaining a good working precision of the drill tool.

Reference is now made to FIGS. 10–13, which illustrate an alternative embodiment of the cutting body 2A. In this case, the recess 32A only extends along a part of the flank surface 25A in a direction parallel to the center axis, whereby the recess is delimited by not only the abutment surface 33A and the support surface 34A, respectively, but also by a bottom surface 41A. The supporting shoulder of the seat (not shown) co-operating with the recess 32 on the inside of the seat is correspondingly shortened. More precisely, the supporting shoulder ends in a transverse lower surface at a distance from the bottom surface 9 of the seat. In doing so, said lower surface of the supporting shoulder is located in such a manner that it is free of (spaced from) the bottom surface 41A of the recess 32A in order to avoid over-determination of the cutting body.

In FIGS. 14–17, an additional alternative embodiment of the cutting body 2B is shown. In this case, grooves 42B are formed in each of the outer surfaces 22B, 23B of the cutting body, each groove extending from the bottom side 21B of the cutting body to the area of the countersunk surface 39B behind each flank surface 38B. Between the inner ends of the grooves 42B, an additional groove 43B extends which connects the two grooves 42B with each other. When the cutting body is assembled in the appurtenant seat, these grooves 42B, 43B form, together with the surfaces 9,10,11 of the seat, ducts through which a cooling fluid may be fed up to the edge portion of the cutting body. Thus, in this case a cooling fluid duct may extend centrally through the drill shaft (not shown in FIGS. 14–17) and intersect the bottom surface 9 of the seat. In other words, the conventional ducts 20 in the protuberances 4, 5 of the shaft (see FIG. 5) can be eliminated. An advantage of the cutting body according to FIGS. 14–17 is that the cooling fluid ducts formed by means of the grooves 42B, 43B exit considerably closer to the cutting edges of the cutting body than in the cases where cooling fluid ducts are formed so that they exit in the shaft, as is shown in FIG. 5. In other words, the cooling fluid supply to the actual cutting edges is made more efficient.

Here, it should be pointed out that each one of the grooves 42 may be formed so that it sub-divides into a plurality of different, fine grooves which exit at different positions along the surface 39.

FEASIBLE MODIFICATIONS OF THE INVENTION

The invention is not solely restricted to the embodiments described above and shown in the drawings. Although it is preferred to form the co-operating abutment surfaces 16, 33 of the supporting shoulder 15 and of the recess 32 inclined in the manner described above, said surfaces may also be formed in another manner. The two abutment surfaces may, for instance, extend axially and be either oblique or oriented perpendicularly to the surface 23. It is also feasible to incline the abutment surfaces in relation to the axial extension of the drilling tool, but orientated perpendicularly to the outer surface 23 of the cutting body.

Although the invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A drilling tool comprising a rotary shaft and a cutting body detachably connected by a fastening screw in a seat formed in a front surface of the shaft;

the seat including first and second spaced-apart protrusions projecting forwardly from a bottom surface of the seat and disposed on opposite sides of a center axis of the shaft; the protrusions including respective first and second inner surfaces facing one another;

the first protrusion including a screw-threaded first hole extending into the first inner surface;

the second protrusion including a supporting shoulder projecting from an end of the second inner surface located remotely from the first protrusion; the supporting shoulder including a first supporting surface facing generally in the same direction as the second inner surface, and a first abutment surface facing in a direction generally laterally of the direction in which the second inner surface faces; the first abutment surface facing generally in a direction toward an end of the second protrusion located proximate the first protrusion; a distance between the second inner surface and the first supporting surface defining a thickness of the supporting shoulder;

the cutting body forming a cutting edge structure and including first and second flank parts disposed adjacent the first and second protrusions, respectively; the cutting body including first and second outer side surfaces facing the first and second inner surfaces, respectively; the second flank part including a recess in which the supporting shoulder is received, the recess including a second abutment surface, and a second supporting surface respectively facing the first abutment surface and the first supporting surface; a depth of the recess being less than the thickness of the supporting shoulder, wherein the first and second supporting surfaces abut one another, and the second side surface is spaced from the second inner surface;

the first flank part including a non-threaded second hole extending therethrough and passing through the first and second side surfaces, wherein the fastening screw extends through the second hole and is threadedly secured in the first hole; the first and second holes being slightly non-aligned wherein a tightening of the fastening screw applies a first force pressing the first inner surface and the first side surface against one another and a second force pressing the first and second abutment surfaces against one another.

2. The drilling tool according to claim 1 wherein the first and second abutment surfaces are oriented to press a bottom surface of the cutting body against a bottom surface of the seat in response to the first and second abutment surfaces being pressed together by the second force.

3. The drilling tool according to claim 2 wherein the first and second abutment surfaces are also oriented to press the first and second supporting surfaces against one another in response to the first and second abutment surfaces being pressed together by the second force.

4. The drilling tool according to claim 3 wherein the first abutment surface extends in a direction which is axially rearward and radially outwardly inclined to form an angle with the center axis; the second abutment surface extending in a direction which is axially rearward and radially inwardly inclined, wherein the first abutment surface presses the cutting body axially rearwardly in response to the second force pressing the first and second abutment surfaces together, to cause a bottom surface of the cutting body to be pressed against a bottom surface of the seat.

5. The drilling tool according to claim 4 wherein the angle is in the range of 1–15 degrees.

6. The drilling tool according to claim 5 wherein the angle is in the range of 5–12 degrees.

7. The drilling tool according to claim 1 wherein the first and second abutment surfaces are oriented to press the first and second supporting surfaces against one another in response to the first and second abutment surfaces being pressed together by the second force.

8. The drilling tool according to claim 7 wherein the first abutment surface is inclined at an angle from a radially inner end of the first supporting surface in a direction having a radially outward component.

9. The drilling tool according to claim 8 wherein the angle is in the range of 60–89°.

10. The drilling tool according to claim 9 wherein the angle is in the range of 70–85°.

11. The drilling tool according to claim 1 wherein the first and second holes are slightly misaligned in a direction causing a bottom surface of the cutting body to be pressed against a bottom surface of the seat by the fastening screw.

12. The drilling tool according to claim 1 wherein an end of the second hole intersecting the second side surface is widened at such intersection and intersects a concavely recessed portion of the second side surface.

13. The drilling tool according to claim 1 wherein at least one of the first and second side surfaces of the cutting body includes a groove extending from a bottom surface to a front surface of the cutting body; the shank including a channel communicating with a rear end of the groove for conducting cooling fluid thereto.

14. A cutting body adapted for use in a metal-cutting drill, comprising:

a top surface and a bottom surface facing in respective opposite directions, the top surface forming cutting edges;

first and second flank surfaces extending downwardly from opposite ends of the top surface;

first and second side surfaces extending downwardly from opposite sides of the top surface, each side surface extending from the first flank surface to the second flank surface, a recess formed in the body and intersecting both the second flank surface and the second side surface, a non-threaded through hole extending through the cutter body from the first side surface to the second side surface and situated closer to the first flank surface than to the second flank surface.

15. The cutting body according to claim 14 wherein the recess includes a supporting surfacing facing in the same general direction as the second side surface, and an abutment surface facing in the same general direction as the second flank surface, the abutment surface extending toward the top surface and inclined at an acute angle toward the first flank surface, the acute angle being in the range of 1–15 degrees.

16. The cutting body according to claim 15 wherein the angle is in the range of 5–12 degrees.

17. The cutting body according to claim 15 wherein the acute angle constitutes a first acute angle, the abutment surface extending toward the second side surface and being inclined at a second acute angle toward the second flank surface, the second acute angle being in the range of 60–89 degrees.

18. The cutting body according to claim 17 wherein the second acute angle is in the range of 70–85 degrees.

19. The cutting body according to claim 14 wherein the through-hole intersects a concavely curved portion of the second side surface and is widened where it intersects that concavely curved portion.

20. The cutting body according to claim 14 wherein at least one of the first and second side surfaces includes a groove extending from the bottom surface to the top surface.

\* \* \* \* \*